Figures 1, 4:
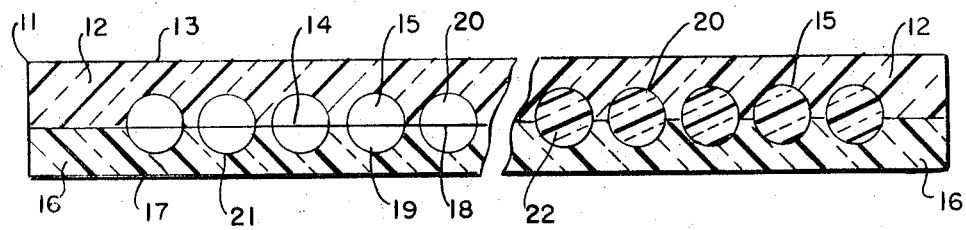

United States Patent [19]

Lemelson

[11] 3,827,783

[45] Aug. 6, 1974

[54] OPTICAL SHEET MATERIAL

[76] Inventor: Jerome H. Lemelson, 85 Rector St., Metuchen, N.J. 08840

[22] Filed: Jan. 4, 1973

[21] Appl. No.: 320,971

Related U.S. Application Data

[63] Continuation-in-part of Ser. No. 56,047, June 24, 1970, Pat. No. 3,716,445, which is a continuation-in-part of Ser. No. 489,654, Sept. 23, 1965, Pat. No. 3,396,639.

[52] U.S. Cl. ............... 350/104, 350/105, 350/128, 350/167
[51] Int. Cl. ............................................. G02b 5/12
[58] Field of Search ....................... 350/97–109, 350/117–129, 167; 404/9–16

[56] References Cited
UNITED STATES PATENTS

| | | | |
|---|---|---|---|
| 2,213,077 | 8/1940 | Schwartz | 350/126 |
| 2,218,909 | 10/1940 | Gill, Jr. | 350/105 |
| 2,330,097 | 9/1943 | Waters | 350/107 |
| 2,407,680 | 9/1946 | Palmquist et al. | 350/105 |
| 3,215,039 | 11/1965 | Gill, Jr. | 350/107 |
| 3,237,331 | 3/1966 | Gill, Jr. | 350/107 |

*Primary Examiner*—John K. Corbin
*Assistant Examiner*—Michael J. Tokar

[57] ABSTRACT

New and improved structures are provided in transparent sheet materials capable of performing a variety of functions in optical systems. The sheet materials contain a plurality of lenses or lens formations disposed or formed between the surfaces of the sheet which may serve to reflect or focus light directed through the sheet.

In one form, lens formations are embossed or molded as a plurality of cavities between the surfaces of the sheet.

In another form, cavities between the sheet surfaces contain optical lenses which are made of a transparent material having a higher or lower refractive index than the index of refraction of the material comprising the sheet itself.

10 Claims, 4 Drawing Figures

PATENTED AUG 6 1974　　3,827,783

OPTICAL SHEET MATERIAL

RELATED APPLICATIONS

This is a continuation-in-part of application Ser. No. 56,047 filed June 24, 1970 now U.S. Pat. No. 3,716,445, which was a continuation-in-part of application Ser. No. 489,654 filed Sept. 23, 1965, now U.S. Pat. No. 3,396,639 having as a parent application Ser. No. 360,954 filed June 11, 1953, now U.S. Pat. No. 3,220,871.

SUMMARY OF THE INVENTION

This invention relates to new and improved structures in transparent optical materials which are capable of performing a variety of different functions which functions include the focusing of light in optical systems for the purposes of recording or otherwise utilizing the focused light and for defocusing light for enlargement purposes.

In a preferred form of the instant invention, a multitude of small spherical or cylindrical lenses are provided within a sheet of transparent material, such as a synthetic plastic polymer, by either molding lens formations in the surface of a single sheet or in two sheets of material and then abutting the sheets or casting one against the other or by disposing a multitude of small, preformed lenses between two layers of transparent material, such as plastic, and forming a unitary sheet structure thereof wherein the interfaces between the lenses and the sheet material remain.

It is known in the art to provide optical lenses by molding lens formations in the outer surfaces of transparent disks and the like. Such lens formations have been limited to corner-reflecting cavities and half lenses due to the characteristics of the embossing or molding process and the fact that undercut shapes may not be easily removed from the mold or embossing die. Other optical devices such as reflectors have employed small glass spheres which have been deposited onto a layer of molten or liquid plastic which construction has been used in the production of reflective sheeting. However, such constructions have heretofore been limited to their use in light reflection systems such as highway safety devices, and they have suffered a number of shortcomings.

The instant invention is concerned primarily with new and improved constructions in reflecting and light focusing sheet materials which are completely transparent and contain lenses or lens formations therein which are uniform in configuration from one optical device to the next. This uniformity may include the provision of all lens or reflecting surface formations of the same size and shape and uniformly or predeterminately spaced throughout the optical device.

Accordingly, it is a primary object of this invention to provide new and improved structures in optical devices.

Another object is to provide an optical device through which light may be transmitted, which is capable of focusing such light within or beyond the device.

Another object is to provide an optical sheet material having flat, opposed major surfaces and lens means disposed between said surfaces for focusing and defocusing light.

Another object is to provide a method of constructing an optical device composed of a plurality of lenses which are predeterminately located with respect to each other within the device.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figures 2, 3:
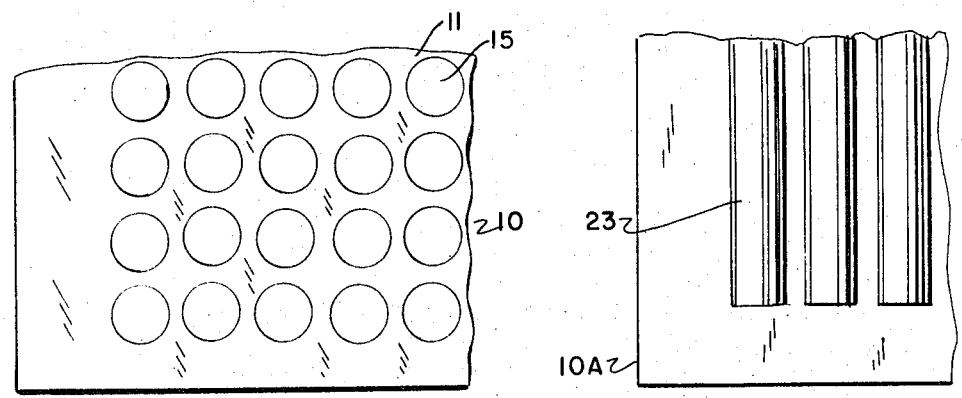

In the Drawings:

FIG. 1 is a side view in cross section of a portion of an optical sheet material containing spherical lenses disposed between the major surfaces of the sheet, FIG. 2 is a plan view of the portion of optical sheet material in FIG. 1, FIG. 3 is a plan view of a modified form of the sheet shown in FIG. 1, FIG. 4 is a side view, in cross section of yet another form of optical sheet material.

In FIG. 1 is shown an optical device 10 in the form of a sheet 11 of light transmitting material and having opposite major faces 13 and 17 thereof substantially flat and parallel to each other. The sheet 11 is composed of two separate stratum 12 and 16 each of which is made of the same transparent material which may comprise a light transmitting plastic polymer or glass.

Formed in the inner surface 14 of the stratum 12 which may comprise a sheet of transparent material, are a plurality of cavities 15 which are closely spaced together and preferably arranged in a predetermined pattern or patterns throughout the stratum or sheet. In one form of structure, the cavities 15 may be semi-spherical in shape and may be arranged in a plurality of parallel rows thereof extending in a first direction with the cavities also aligned in a direction normal to said first direction and defining a plurality of parallel rows in said normal or second direction. The surfaces of the cavities 15 are preferably substantially void of irregularities so that the cavities may serve as respective semi-spherical lens formations for focusing or defocusing light passing through the sheet.

Provided integral with the stratum or sheet 12 is a second stratum or sheet 16 having an inner surface 18 facing the surface 14 of the stratum 12 and having cavities 19 formed in said surface 18. In a preferred form, the cavities 19 are each substantially semi-spherical in shape and are each aligned with a respective cavity 15 in the stratum 12 so as to form respective spherical voids or cavities within the sheet 11 between the major surfaces 13 and 17 thereof.

Depending on the intended use of the optical device 10, the cavities 20 may be utilized per se to reflect and/or focus light directed through the sheet 11 from either surface thereof. Thus the optical device may be utilized as a multi-lens reflector or a multi-lens focusing device for light in an optical system where it is desired to perform such functions as splitting or dividing incident light into a plurality of beams or defocusing light from a plurality of space-separated areas immediately adjacent the surface of the sheet 11 from which the light originates or is reflected.

A number of modifications to the optical device 10 of FIG. 1 are noted as follows:

I. The semi-spherical surfaces of the cavities in either of the stratum or sheets 12 and 16 may be highly polished or metallized with a thin film of metal such as aluminum providing said surfaces as a plurality of small, spherical reflectors permitting the device to be used as a reflex-reflecting sheet material for light passed through that stratum containing cavities which are not so metallized.

II. The cavities 20 formed within the sheet of the semi-spherical formations in each of the stratum may each be filled with a transparent lens material having an index of refraction which is higher or lower than the refractive index of the material forming the stratum 12 and 16 and preferably such that the difference between refractive indices is greater than the difference between the refractive index of the material of the sheet 11 and air or gas which would ordinarily fill the cavities. As such, the spherical formations 22 filling the cavities 20 will serve as respective spherical lenses for focusing or defocusing light passing through the sheet and the assembly may be used as an efficient, multi-lens optical unit in various optical systems.

Notation 21 refers to a metallized coating, as described, provided on the surfaces of the cavities of one of the sheets which may be utilized per se or in combination with a spherical lens formation disposed within the cavity.

III. The cavity formations provided between the major surfaces of the sheet 10 may be shaped other than spherical and may form, for example, a plurality of parabolic or elliptically shaped surface lenses, prisms, corner reflectors, semi-cylindrical or cylindrical lenses.

In FIG. 3 is shown a modified form of the structure shown in FIG. 1 wherein the cavities 23 formed between the major surfaces of the sheet 10A are elongated, cylindrical formations. They are shown as being parallel to each other and equi-spaced throughout the stratum of the sheet in which they exist although they may be of varying size, spacing and configuration depending on the desired optical results.

In yet another configuration, a variety of different optical components may be formed by molding as described or disposed between the major surfaces of the optical sheet, which components are of different configuration but are predeterminately located with respect to each other and are operable to perform different functions in the same or variably adjusted system. In other words, a plurality of lenses or lens formations may be provided in a single sheet of transparent material as described, such as lens formations or lenses of different focal length which are to be simultaneously utilized in the same optical system or may be respectively disposed in a particular optical system by variably positioning the sheet containing same and the optical system.

In FIG. 4 is shown a modified form of the optical structure shown in FIG. 1 wherein the spherical cavities 20 formed between the two sheets each contain a respective transparent sphere or ball 22 completely filling said cavities and each defining a respective small lens operable to focus and-or reflect light directed thereagainst. The material of which the lenses 22 are formed may comprise a suitable glass or other ceramic material of high refractive index, preferably above 1.9, or a suitable plastic polymer of suitable refractive index. Materials of which the sheets or layers 12 and 16 may be made may comprise such polymers as cellulose acetate butyrate, methyl methacrylate, polyvinyl acetate, butadiene acrylonitrile copolymers, styene butadiene, polyvinyl acetate and cellulose acetate while the lens formations or spheres 22 may comprise such polymers as cellulose acetate, polyvinyl chloride, polyvinyldene cloride and polycarbonate resins. The former group has refractive indexes in the range of 1.46 to 1.5 whereas the latter group's refractive indexes vary from 1.54 to 1.60. If the lens formations or balls are made of glass or other material having refractive indexes above about 1.9, then the sheet material may comprise any of the described polymers as there is sufficient difference between the corresponding refractive indexes of the two materials to permit optical refraction to occur between the surfaces of the lenses and the surfaces of the cavities in which they are secured.

If both the lenses 22 and the sheet material surrounding same are made of moldable polymers, then the structure shown in FIG. 4 may be formed by first molding one of the sheet formations 12 or 16 with the semi-spherical or otherwise shape lens holding cavities molded into a surface thereof, thereafter molding the separate lenses 22 to shape within the half cavities by bringing a suitable mold against the surface containing the cavities and double-shot molding said lenses thereagainst. Thereafter the other sheet formation is assembled or molded to shape against the surface of the composite sheet containing the cavities and lenses molded therein.

In a particular form of the structures illustrated in FIGS. 1,2 and 4 the spherical cavities or lenses may be provided as a parallel rows wherein the individual cavities or lenses are equispaced from each other in either one direction or in both directions. They may also be closer together than the diameter of a cavity or lens as shown. Total sheet thickness may vary from about 0.010 inch to about 0.250 inch.

I claim:

1. An optical device comprising:
   a sheet of transparent material of optical clarity having flat, opposite smooth surfaces through which light may pass without distortion,
   a plurality of cavities formed within said sheet and void of the material of said sheet,
   said cavities being disposed in a plurality of parallel rows and columns and defining respective lens surface formations which are shaped to focus and defocus light passing through said sheet.

2. An optical device in accordance with claim 1 wherein said sheet is made of a material having a high refractive index.

3. An optical device in accordance with claim 1 wherein the cavities formed within said sheet are spherical in shape.

4. An optical device in accordance with claim 3 wherein said cavities each contain a material filling the cavity and defining a respective optical lens formation.

5. An optical device in accordance with claim 4 wherein the material filling said cavities of which said respective lens formations are made has a refractive index greater than that of which said sheet is made.

6. An optical device in accordance with claim 1 wherein the cavities within said sheet are substantially cylindrical in shape.

7. An optical device in accordance with claim 1 wherein said sheet is between 0.010 inch and 0.250 inch thick and said cavities define respective lens formations for focusing and defocusing light.

8. An optical device in accordance with claim 3 wherein said cavities are all of equal shape and size and are in the range of 0.005 inch and 0.150 inch in diameter and said sheet of transparent material varies from about 0.010 inch and 0.250 inch thick.

9. An optical device in accordance with claim 8 wherein said sheet of transparent material is made of a polymer selected from the group consisting of methyl methacrylate, cellulose acetate, cellulose acetate butyrate, polyvinyl chloride, polyvinyldene chloride, polystyrene, acrylic and polycarbonate resins.

10. An optical device in accordance with claim 1 including a transparent material filling each of said cavities in said sheet and made of a material having an index of refraction which is different from the refractive index of the material comprising said sheet, one of said transparent materials being selected from the group of polymers consisting of celluloase acetate butyrate, methyl methacrylate, butadiene acrylonitrile copolymers; sytrene butadiene and polyvinyl chloride, vinyl acetate copolymer and the other of said materials being selected from the group consisting of cellulose acetate, polyamide, polyvinyl chloride, polyvinyldene chloride and polycarbonate resins, said sheet being between 0.010 inch and 0.250 inches thick and said cavities varying in diameter from one third to two thirds the thickness thereof, and being separated from each other by distances of one half to three times their diameters.

* * * * *